Aug. 2, 1966  F. D. JOESTING  3,263,925
CONDITION CONTROL SYSTEM
Filed Dec. 14, 1964
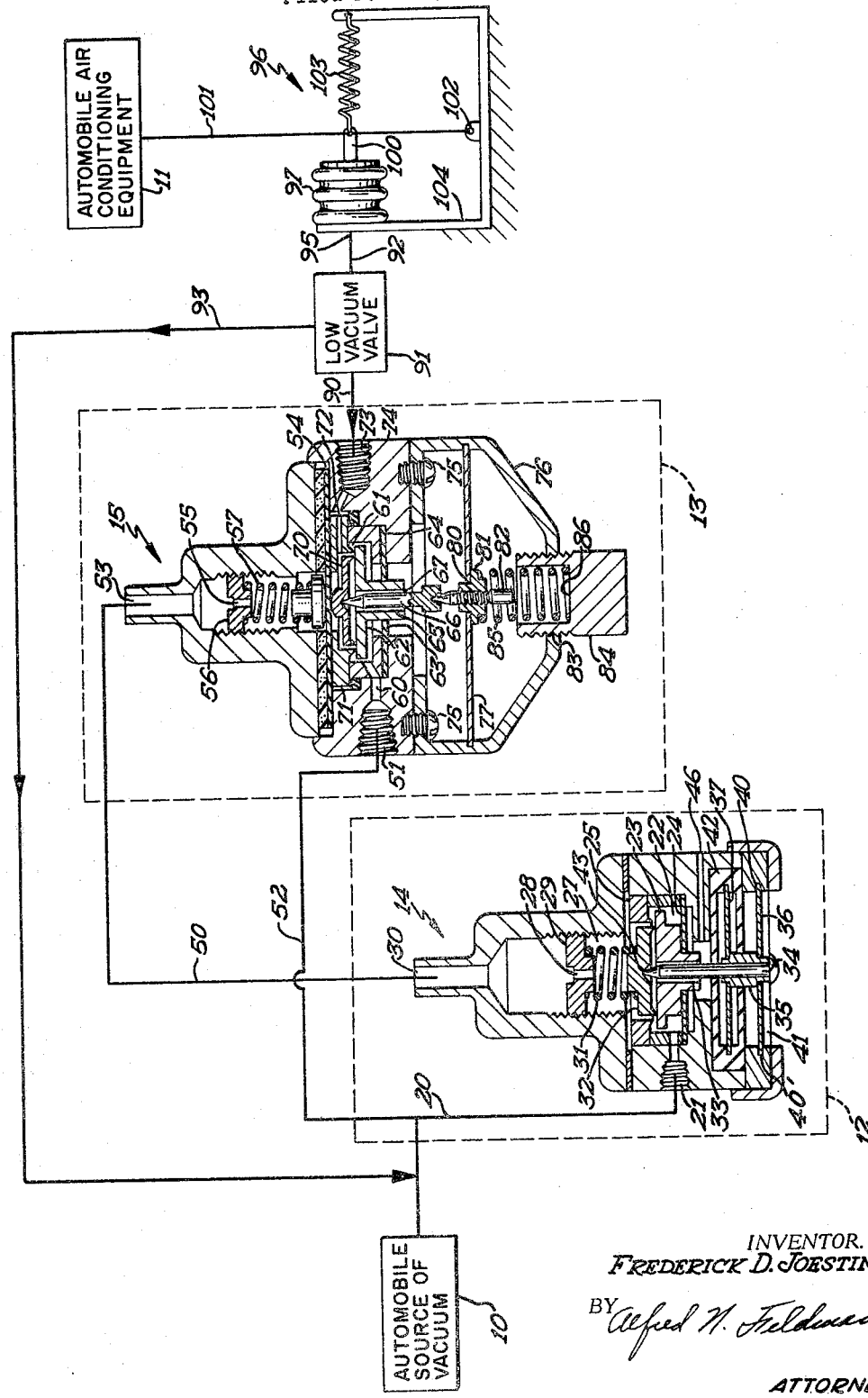
INVENTOR.
FREDERICK D. JOESTING
BY Alfred N. Feldman
ATTORNEY

United States Patent Office

3,263,925
Patented August 2, 1966

3,263,925
CONDITION CONTROL SYSTEM
Frederick D. Joesting, Park Ridge, Ill., assignor to Honeywell Inc., Minneapolis, Minn., a corporation of Delaware
Filed Dec. 14, 1964, Ser. No. 417,925
9 Claims. (Cl. 236—9)

The present invention is directed to a condition control system wherein a first condition responsive element provides a reset condition for a second condition responsive element, and where the two condition responsive elements are sensitive to two different, but inter-related conditions. More specifically, the present invention is directed to a temperature control system for such devices as automobiles, and wherein the first temperature responsive element is exposed to the flow of conditioning medium, and wherein the second condition responsive element is responsive to the ambient temperature within a space being controlled.

In recent years the utilization of air conditioning equipment has grown drastically and this growth has been reflected in the increasing use of air conditioning equipment in automobiles. Ordinary air conditioning equipment for control of temperature in relatively large and fixed installations has a somewhat different problem from the control of air conditioning equipment in automobiles due to the rapidly changing conditions to which an automobile is subjected, and also is related to the relatively small ambient chamber or passenger compartment of an automobile. At the outset of the installation of air conditioning equipment in automobiles, the potential market was relatively small and the control was therefore of little direct interest to the manufacturing community. As the importance of automobile air conditioning increased, the manual control systems originally installed on automobile air temperature control were replaced by semiautomatic types of control equipment. The market for automobile temperature control has now sufficiently grown, and has become sufficiently sophisticated, to require a very good, consistent control system for the popular utilization of this type of air conditioning installation. Recent statistics show that approximately 16% of all of the automobiles being manufactured in the United States have factory installed air conditioning equipment. As a result of this, the interest in the control of this type of equipment has grown along with the recognition that in order to make this type of equipment practical and useful, that some control other than the manual control originally used on this type of equipment was necessary.

Automobile air conditioning systems generally utilize the conventional components of an air conditioning system, but due to the closeness of the equipment and the small size of the passenger compartment, problems evolve that are not readily met by conventional air conditioning control systems. The rapid changes in ambient temperature, the changes of startup and subsequent run conditions, and the changes in the surroundings of the automobile rapidly change the conditions that are to be met by the temperature control system. As a result of this, a unique type of temperature control system has been developed, and is described in detail in the present application.

It is a primary object of the present invention to disclose an automobile temperature control system which uses the automobile vacuum as a powering means for the system and which responds to both the ambient temperature within the car and to the discharge temperature of the air conditioning medium supplied by the air conditioning equipment.

A further object of the present invention is to disclose a condition control system that has an element responsive to the rate of change of the condition tempering medium, that in turn provides an adjusted level of operation for the condition control element that responds to the ambient condition to which the overall system is responsive.

Still a further object of the present invention is to disclose a pneumatic temperature control system that uses a first temperature responsive valve means to respond to the rate of change of the temperature of the medium used for condition control, and which in turn controls a second temperature responsive regulating valve that is exposed to the ambient that is in fact being controlled.

These and other objects of the present invention will become apparent when the single figure is fully considered with the present disclosure.

Before the specific embodiment of the invention is described in detail, certain of the terms and requirements of the device will be discussed. The present application discloses a temperature control system specifically adapted for use in automobiles and wherein the normal vacuum source of the automobile is used as a powering means. It should be pointed out that the control system could be used on any type of pneumatic or pressure operated system, and that as a result of this, the terminology used in the present application, while being directed specifically to a vacuum controlled system, is applicable to any system utilizing a pressure differential as an activating medium. The fact that vacuum is utilized, merely infers that a pressure differential, or some pressure above absolute zero is available. Since the term "vacuum" is a relative term in its normal usage meaning any pressure below that of atmospheric, the present specification will use the term "vacuum" in its normal sense, but it must be understood that the applicant wishes to be limited in the disclosure and application of the present invention in no way to the use of a vacuum alone.

The condition control system as specifically disclosed herein, is referenced to the control of an air conditioning system for an automobile. A source of vacuum 10 for an automobile is disclosed as the penumatic powering means or means to supply a pressure differential for operating the system. The automobile air conditioning equipment itself is disclosed at 11. The automobile air conditioning equipment 11 includes an outlet duct means 12 through which air is delivered to an automobile passenger compartment 13. Within the duct means 12 is a three-way thermostatic valve means 14. Within the passenger compartment of the automobile is a thermostatically operated pressure regulating valve means disclosed generally at 15. The valve means 14 and 15 will be described in detail below.

The automobile vacuum source 10 is connected by pipe 20 to the three-way thermostatic valve means 14 at an inlet 21. Inlet 21 connects to a chamber 22 that is sealed at its bottom by a valve member 23 and a diaphragm 24. The chamber 22 has a fixed valve seat 25 at its upper edge and interconnects to an upper chamber 27 that is in turn connected through a passage 28 in a threaded member 29 to an outlet 30 of the thermostatic valve means 14. A spring 31 is placed between the member 29 and a third valve member 32 and holds the valve member 32 against the lower valve member 23. Passing through a loose fitting hole 33 in member 23 is a pin 34 that is attached to a sleeve 35. The sleeve 35 is rigidly attached to the pin 34, and the sleeve 35 carries a pair of bimetals 36 and 37. The two bimetals 36 and 37 are substantially identical in configuration and are placed so as to have oppositely disposed actions upon changes of temperature. As a result of this, at one temperature, the two bimetals tend to cancel one another out by supplying equal and opposite reactions. The bimetal 36 is mounted at 40, 40' in an opening 41 in the bottom of valve means 14. The bimetal 37 is mounted in an insulating chamber 42 that is supported above the opening 41. The insulating material 42 completely encircles and isolates the bimetal 37 from the ambient while the bimetal 36 is exposed in the opening 41 to the ambient of the air in outlet duct means 12. The pin 34 attached to the sleeve 35 carrying the bimetals 36 and 37 passes upward through the hole 33 and seats in a hole 43 in the bottom of the valve member 32. The pin 34 therefore applies a force to the underside of the valve member 32 in opposition to the spring 31. The balance of the valve structure is of little direct interest in the present disclosure and will not be described in detail in order to avoid confusing the description. The balance of the valve member 14 can be formed by any conventional means and assembled in any conventional manner.

The valve means 14, in the position shown, has an opening between the inlet 21 around the outer edge of the lower valve member 23, past the upper valve seat 25, and through the hole 28 to the outlet 30 of the valve means 14. This position is the bottom or lowest position taken by the pin 34 in its range of movement. As pin 34 is forced in an upward direction by the effects of temperature on the bimetals 36 and 37, the lower valve member 23 eventually reaches the valve seat 25 while carrying the valve member 32 in an upward direction against the spring 31. As soon as the lower valve member 23 reaches the valve seat 25, it no longer continues to move and seals off the chamber 22 from chamber 27. Continued upward movement of the pin 34 causes the upper valve member 32 to continue to rise thereby lifting off of the lower valve member 23. The lifting of the valve member 32 from the valve member 23 places the hole 33 in communication with the hole 28 by the free space around the edge of valve member 23, and then in communication with outlet 30 of the valve means 14. It will be noted that hole 33 is in communication with a chamber 45 that is in turn connected to a passage means 46 that forms a bleed port means to the atmosphere. Thus, in the position disclosed in the drawing, the bleed port means 46 is sealed by the joining of the lower valve member 23 and the upper valve member 32 thereby removing the bleed port means 46 from effective use while the vacuum is connected from the inlet 21 to the outlet 30. At an intermediate point, where the valve means 23 just resets against the valve seat 25, no communication is present between the inlet 21 and the outlet 30, but also at this point there is no bleed connection between the bleed port means 46 and the outlet 30. As the pin 34 continues to rise, the outlet 30 is connected to the bleed port means 46 thereby bleeding any vacuum in the outlet 30 of the valve means 14 to the atmosphere. This function will be related to the system operation after the balance of the system has been described in detail.

At this point, one of the unusual features of the valve means 14 should be noted. The valve means 14 has a valve arrangement that is substantially immune to variations in supplied vacuum. It will be noted that the device as disclosed in the drawing has been exaggerated for clarity, but in actual practice the valve member 32 is only very slightly smaller than the valve seat 25. For all practical purposes, the valve member 32 and the valve seat 25 have the same effective areas exposed to the chamber 22 which in turn are exposed to the diaphragm 24. This provides a balanced valve arrangement that is substantially unaffected by variations in the supply vacuum for the device. With this arrangement when variations of the automobile source vacuum 10 occur, the effect on the valve means 14 is insignificant. This same feature applies to the valve means 15, as will be seen when this valve means is described in detail.

The outlet 30 of the valve means 14 is connected by pipe 50 to a regulating inlet 53 of the temperature responsive pressure regulating valve means 15 to supply a vacuum to the upper side of a diaphragm 54 through a hole 55 in an adjusting member 56 that has a spring 57 that spring loads the diaphragm 54. An inlet 51 supplies the regulating valve means 15 with a source of vacuum by a pipe 52 connected to source 10.

The inlet 51 is connected to a passage 60 that in turn connects to a chamber 61 which is very similar in function and structure to the chamber 22 of the valve means 14. Within chamber 61 is a lower valve member 62 that is joined to a diaphragm 63 that in turn is supported at 64 by the valve means 15 in any convenient fashion. The lower valve member 62 has a passage 65 around a pin 66 and the passage 65 is open to the atmosphere at 67.

The pin 66 bears on the underside of a valve member 70 that rides on the top of the valve member 62. A fixed valve seat 71 is provided immediately adjacent the diaphragm 54 and forms the upper valve member for the three-way operation of the valve means 15. The operation of the valve means 15 is very similar to that of the valve means 14 except for the pressure regulating function provided by the vacuum applied to the top of diaphragm 54. To provide an outlet, the valve means 15 has an outlet passage 72 connected to an outlet means 73 wherein the passage is connected above the valve member 70, which forms the area under the diaphragm 54. A lower portion 74 of the valve means 15 supports by a pair of screws 75 a bracket 76 that in turn supports a bimetal 77 that is responsive to the ambient air in the passenger compartment 13. The bimetal 77 has a central opening 80 that has a threaded member 81 supported therein. The threaded member 81 has a threaded adjusting pin 82 passing therethrough and abutting against the bottom of the pin 66 to apply a bias to the pin 66 for operation of the valve means 15.

The bracket 76 is threaded at 83 to receive an adjusting means 84 that is threaded through the threaded portion 83. The adjustment means 84 supports a spring 85 that bears at the surface 86 and against the member 81 which is attached to the bimetal 77. It is obvious that any adjustment of the means 84 changes the bias of spring 85 thereby changing the adjustment of the force supplied to and by the bimetal 77 and therefore changes the set point. The force supplied is transmitted through the pin 82 to the pin 66 which in turn operates the valve.

In the position shown, valve means 15 is closed or in its middle position. There is no connection between the inlet 60 and the outlet 73. If the bimetal 77 is acted upon by the ambient temperature in the passenger compartment 13 so as to move in a downward direction, the pin 66 moves downward under the force of the spring 57 and the pressure contained in the area above the diaphragm 54. This causes the valve member 70 and the valve member 62 to move in a downward direction. This opens a direct connection between the inlet 60 and the outlet 73 of the valve means 15. If the spring 57 moves in an upward direction from that shown in the drawing, the pin 66 raises the valve member 70 against the diaphragm 54 thereby allowing the valve member 62 to seat firmly against the valve seat 71. The raising of the valve member 70 connects the bleed port means associated with the hole 65 to the outlet 73 thereby bleeding any trapped vacuum to the atmosphere.

It is thus apparent that the overall function of the valve means 15 is somewhat similar to that of the valve means 14 but the valve means 15 is adjusted by a single bimetal and by its own input pressure to provide the regulating function in response to the temperature of the passenger compartment 13. This is the normal ambient being controlled by the system.

The outlet 73 of the valve means 15 is connected by pipe 90 to a low vacuum valve 91 which in turn has an outlet 92. The low vacuum valve 91 can be any vacuum responsive valve that is capable of closing pipe 92 whenever the vacuum in the system is lost or is beneath some predetermined level to hold actuator in its last called-for position, and not let the lower vacuum change its position, and erroneously call for a change in heating or cooling. The control of the low vacuum valve 91 is accomplished by supplying a vacuum from the automobile vacuum source 10 via pipe 93. The specific construction of the low vacuum valve 91 is not material and its inclusion in the system is merely a safety feature to prevent the air conditioning equipment 11 from changing if the vacuum source 10 falls below some predetermined level thereby indicating that the automobile is functioning in a mode where the use of the vacuum by the control system might be detrimental.

The pipe 92 connects to the inlet 95 of an actuator means 96 of any convenient type. The actuator means 96 has been disclosed as simply a bellows 97 connected to pipe 92 at inlet 95. The bellows responds to changes in pressure between the vacuum line 92 and the atmospheric pressure on the external surface on the bellows. The bellows 97 has a link 100 that is connected to linkage means 101 that is in turn pivoted at a fixed point 102. The movement of the bellows 97 causes the link 100 to pivot the linkage means 101 thereby operating the automobile air conditioning equipment 11. In order to make the device responsive over a full range of operation, a spring 103 is supported between the link 100 and a bracket 104. The bracket 104 in turn also supports the bellows 97. It is thus apparent that when a sufficient vacuum is drawn on line 92 that the bellows 97 collapses thereby moving the linkage means 101 to the left. Upon the release of the vacuum on line 92, the spring 103 moves the bellows 97 to the right thereby moving the linkage means 101 to the right. This type of actuator is well known in the pneumatics art and has been shown in a schematic form merely to complete the present disclosure.

*Operation*

The operation of the system will now be described in order to more clearly establish the relative function of the two valve means 14 and 15 in the present system. It will be assumed that the automobile and its associated equipment have been operating wherein the source of vacuum 10 and the air conditioning equipment 11 are in a normal operating condition. As was previously stated, the valve means 14 and 15 have been shown in an open and close position as a convenient way of disclosing the structure and function of the valve means. The positions shown in the drawing are not necessarily the positions assumed for the present description of the operation of the system as a whole.

With the system in a balanced condition, the valve means 14 normally will assume some position wherein vacuum is supplied to pipe 50 to provide a bias for valve means 15. The vacuum is also supplied on pipe 52 directly to valve means 15, and if the system is balanced, the vacuum supplied on the pipe 50 and the force supplied by the bimetal 77 and the springs in the valve means 15 will balance out to some stable position. If the temperature in the passenger compartment 13 changes, or if the adjustment means 84 is changed, the valve means 15 will either open to supply more vacuum to the bellows 97, or will bleed the bellows 97 to the atmosphere. It will be assumed that a change occurs to the valve means 15 which causes the valve member 70 to move in a downward direction thereby opening the passage 60 to the passage 72 and outlet 73 of the valve means 15 wherein a greater supply of vacuum is supplied in turn to the bellows 97. The bellows 97 is collapsed by the air pressure external to the bellows 97 and moves the linkage means 101 to the left thereby changing the condition of the automobile air conditioning equipment 11. This change in the condition of the automobile air conditioning equipment 11 changes the temperature of the air being supplied to the air flow duct means 12 and to the ambient or passenger compartment 13. This change in the temperature of the air immediately affects the bimetal 36, but has little or no immediate effect on bimetal 37 as the bimetal 37 is insulated. The immediate effect on the valve means 14 is to cause the valve means 14 to change position thereby changing the vacuum supplied on pipe 50 to the regulating inlet 53 of the valve means 15. This applies a different vacuum to the diaphragm 54 which in turn tends to balance out the change that has initiated the change in action of the system. As time progresses, the new air inlet temperature in the air flow duct means 12 finally reaches the bimetal 37 and the bimetal 37 balances out against the bimetal 36 to establish a new and stable position.

It thus can be seen that any change in the valve means 15, either by a change in the ambient condition or by adjustment of the adjustment means 84, causes substantially immediate reaction in the air conditioning equipment which is reflected back in the system through the valve means 14 as a snubbing reactiton to establish a new control point for the device. This control point is then gradually adjusted to satisfy the existing conditions without a large degree of oscillation of the temperature or control system.

Should the temperature change in the ambient compartment 13 in a direction to cause the bimetal 77 to move in an upward direction, the movement provides a bleed through the hole 65 to the atmosphere thereby allowing air to be drawn into the bellows 97 allowing the spring 103 to move the linkage means 101 to the right. This arrangement provides for the reverse operation of the present device.

It is thus apparent that the present condition control system is a series arrangement of a three-way rate responsive valve which in turn controls a three-way pressure responsive valve that is also temperature sensitive. The first valve is placed in the flow of the tempered air while the second temperature responsive valve means 15 is placed in the ambient. The arrangement thus disclosed provides a temperature control system that provides for reset based on the condition of the tempering medium flow and also provides for direct response to the ambient conditions. The arrangement disclosed therein provides a temperature control system that has a rapid response to all the varying conditions that exist in such air conditioning situations as the air conditioning of automobiles, as well as in the air conditioning of any other type of environment.

One of the main features of the present arrangement is to provide a system that has a quick response and which tends to damp out any form of oscillation. The use of the valve means 14, which readjusts the vacuum as a rate of function, provides two specific and distinct operating functions. The first function is to respond almost immediately to any change in the discharge temperature in the air flow duct means 12 thereby adjusting the valve means 15 to the immediate needs. This tends to level any wide swings that might occur in the temperature control system. The second function is to slowly bring the device back into balance by leveling out the action as a function of the rate device formed by the bimetals 36 and 37. This tends to damp any oscillations which might otherwise occur.

The applicant has specifically disclosed a temperature control system wherein an automobile vacuum source has been used and the equipment involved has been described as that contained on an automobile. It is obvious that the vacuum involved is nothing more than a negative pressure and that any type of pressure differential could be used for control purposes. It is further obvious that one skilled in the art could apply the present control system to many types of condition responsive systems both of an air conditioning and other types. The applicant believes that the present disclosure would lead one skilled in the art to many possible applications of the novel concept and therefore wishes to be limited in the scope of his invention only by the scope of the appended claims.

I claim:

1. A vacuum operated automobile temperature control system, comprising: an automobile including vacuum source means supplying a vacuum to operate said temperature control system; said automobile including air conditioning means supplying a tempered air flow to a passenger compartment of said automobile; a three-way thermostatic valve having an inlet, an outlet, and an atmospheric bleed port with said inlet connected to said vacuum source means; said valve including temperature rate responsive means comprising a pair of oppositely disposed bimetal members with a first of said bimetal members insulated from the second of said bimetal members; said bimetal members adjusting said valve in response to a temperature of said tempered air flow to which said rate responsive means is exposed; a three-way regulating valve including a regulating inlet, an outlet, and an atmospheric bleed port with said last named regulating inlet connected in a series vacuum circuit to said outlet of said thermostatic valve to receive a controlled vacuum therefrom; said regulating valve including an adjustable temperature responsive bimetal element exposed to an ambient temperature within said passenger compartment; said adjustable temperature responsive bimetal element biasing said regulating valve against said controlled vacuum to regulate a vacuum output with respect to temperature in response to the setting of said adjustable temperature responsive bimetal element; and vacuum actuator means connected to the outlet of said regulating valve to receive said vacuum output to operate said air conditioning means in response to the temperatures of said tempered air flow and said ambient temperature within said passenger compartment.

2. A pneumatically operated temperature control system, comprising: air source means supplying an air pressure to operate said temperature control system; a three-way thermostatic valve having an inlet, an outlet, and an atmospheric bleed port with said inlet connected to said air source means; said valve including temperature rate responsive means comprising a pair of oppositely disposed bimetal members with a first of said bimetal members insulated from the second of said bimetal members; said bimetal members adjusting said valve means in response to a temperature of a conditioning medium to which said rate responsive means is exposed; a three-way regulating valve including a regulating inlet, an outlet, and an atmospheric bleed port with said last named regulating inlet connected in a series fluid circuit to said outlet of said thermostatic valve to receive a controlled air pressure therefrom; said regulating valve including an adjustable temperature responsive bimetal element exposed to an ambient temperature to be controlled; said adjustable temperature responsive bimetal element biasing said regulating valve against said controlled air pressure to regulate an air pressure output with respect to temperature in response to the setting of said adjustable temperature responsive bimetal element; and pneumatic actuator means connected to the outlet of said regulating valve to receive said air pressure output to operate said system in response to the temperatures of said conditioning medium and said ambient temperature.

3. A vacuum operated automobile temperature control system, comprising: an automobile including vacuum source means supplying a vacuum to operate said temperature control system; a three-way thermostatic valve having an inlet, an outlet, and a bleed port with said inlet connected to said vacuum source means; said valve including temperature rate responsive means to adjust said valve in response to a temperature of a conditioning medium for said automobile; a three-way regulating valve including a regulating inlet, an outlet, and a bleed port with said last named regulating inlet connected in a series fluid circuit to said outlet of said thermostatic valve to receive a controlled vacuum therefrom; said regulating valve further including an adjustable temperature responsive element exposed to an ambient temperature within said automobile; said adjustable temperature responsive element biasing said regulating valve against said controlled vacuum to regulate a vacuum output with respect to temperature in response to the setting of said adjustable temperature responsive element; and actuator means connected to the outlet of said regulating valve to receive said vacuum output to operate said system in response to the temperatures of said conditioning medium and said ambient temperature within said automobile.

4. A pneumatically operated temperature control system, comprising: air source means supplying air at a pressure differential to operate said temperature control system; three-way thermostatic valve means having an inlet, an outlet, and atmospheric bleed port means with said inlet connected to said air source means; said valve means including temperature rate responsive means to adjust said valve means in response to a temperature of a conditioning medium; three-way regulating valve means including a regulating inlet, an outlet, and atmospheric bleed port means with said last named regulating inlet connected in a series fluid circuit to said outlet of said thermostatic valve means to receive a controlled air pressure therefrom; said regulating valve means including an adjustable temperature responsive element exposed to an ambient temperature to be controlled; said adjustable temperature responsive element biasing said regulating valve means against said controlled air pressure to regulate an air pressure output with respect to temperature in response to the setting of said adjustable temperature responsive element; and pneumatic actuator means connected to the outlet of said regulating valve means to receive said air pressure output to operate said system in response to the temperatures of said conditioning medium and said ambient temperature.

5. A fluid operated temperature control system, including: fluid source means supplying a fluid pressure differential to operate said temperature control system; three-way thermostatic valve means having an inlet, an outlet, and bleed port means with said inlet connected to said fluid source means; said valve means including temperature rate responsive means to adjust said valve means in response to a temperature of a conditioning medium; three-way regulating valve means including a regulating inlet, an outlet, and bleed port means with said last named regulating inlet connected in a series fluid circuit to said outlet of said thermostatic valve means to receive a controlled fluid pressure therefrom; said regulating valve means including an adjustable temperature responsive element exposed to an ambient temperature to be controlled; said adjustable temperature responsive element biasing said regulating valve means against said controlled fluid pressure to regulate a fluid pressure output with respect to temperature in response to the setting of said adjustable temperature responsive element; and actuator means connected to the outlet of said regulating valve means to receive said fluid pressure output to operate said system in response to the temperatures of said conditioning medium and said ambient temperature.

6. A vacuum operated automobile temperature control system, comprising: an automobile including vacuum source means supplying a vacuum to operate said temperature control system; thermostatic valve means having an inlet and an outlet with said inlet connected to said vacuum source means; said valve means including temperature rate responsive means to adjust said valve means in response to a temperature of a conditioning medium for said automobile; regulating valve means connected to said outlet of said thermostatic valve means to receive a controlled vacuum therefrom; said regulating valve means including an adjustable temperature responsive element exposed to an ambient temperature within said automobile; said adjustable temperature responsive element biasing said regulating valve means against said controlled vacuum to regulate a vacuum output with respect to temperature in response to the setting of said adjustable temperature responsive element; and actuator means connected to said regulating valve means vacuum output to operate said system in response to the temperatures of said conditioning medium and said ambient temperature within said automobile.

7. A pneumatically operated temperature control system, comprising: air source means supplying air at a pressure differential to operate said temperature control system; thermostatic valve means having an inlet and an outlet with said inlet connected to said air source means; said valve means including temperature rate responsive means to adjust said valve means in response to a temperature of a conditioning medium; regulating valve means connected to said outlet of said thermostatic valve means to receive a controlled air pressure therefrom; said regulating valve means including an adjustable temperature responsive element exposed to an ambient temperature to be controlled; said adjustable temperature responsive element biasing said regulating valve means against said controlled air pressure to regulate an air pressure output with respect to temperature in response to the setting of said adjustable temperature responsive element; and actuator means connected to said regulating valve means air pressure output to operate said system in response to the temperatures of said conditioning medium and said ambient temperature.

8. A fluid operated temperature control system, including: fluid source means supplying a fluid pressure differential to operate said temperature control system; thermostatic valve means having an inlet and an outlet with said inlet connected to said fluid source means; said valve means including temperature rate responsive means to adjust said valve means in response to a temperature of a conditioning medium; regulating valve means connected to said outlet of said thermostatic valve means to receive a controlled fluid pressure therefrom; said regulating valve means including an adjustable temperature responsive element exposed to an ambient temperature to be controlled; said adjustable temperature responsive element biasing said regulating valve means against said controlled fluid pressure to regulate a fluid pressure output with respect to temperature in response to the setting of said adjustable temperature responsive element; and actuator means connected to said regulating valve means fluid pressure output to operate said system in response to the temperatures of said conditioning medium and said ambient temperature.

9. A fluid operated condition control system, including: fluid source means supplying a fluid pressure differential to operate said condition control system; condition responsive valve means having an inlet and an outlet with said inlet connected to said fluid source means; said valve means including condition rate responsive means to adjust said valve means in response to a condition of a conditioning medium; regulating valve means connected to said outlet of said condition responsive valve means to receive a controlled fluid pressure therefrom; said regulating valve means including an adjustable condition responsive element exposed to an ambient condition to be controlled; said adjustable condition responsive element biasing said regulating valve means against said controlled fluid pressure to regulate a fluid pressure output with respect to said ambient condition in response to the setting of said adjustable ambient condition responsive element; and actuator means connected to said regulating valve means fluid pressure output to operate said system in response to the condition of said conditioning medium and said ambient condition.

References Cited by the Examiner
UNITED STATES PATENTS

| | | | |
|---|---|---|---|
| 2,574,925 | 11/1951 | Lehane et al. | 236—9 |
| 2,602,591 | 7/1952 | Wilson et al. | 236—37 X |
| 2,839,248 | 6/1958 | Edwards | 236—87 |
| 3,221,991 | 12/1965 | Houser | 236—87 |

EDWARD J. MICHAEL, *Primary Examiner.*